(12) United States Patent  (10) Patent No.: US 8,209,303 B2
Vella                     (45) Date of Patent:     Jun. 26, 2012

(54) SYSTEM AND METHOD FOR IMPLEMENTING A RELIABLE PERSISTENT RANDOM ACCESS COMPRESSED DATA STREAM

(75) Inventor: Shon Vella, Orem, UT (US)

(73) Assignee: Novell, Inc., Provo, UT (US)

( * ) Notice: Subject to any disclaimer, the term of this patent is extended or adjusted under 35 U.S.C. 154(b) by 390 days.

(21) Appl. No.: 12/511,624

(22) Filed: Jul. 29, 2009

(65) Prior Publication Data

US 2011/0029492 A1    Feb. 3, 2011

(51) Int. Cl.
*G06F 7/00* (2006.01)
(52) U.S. Cl. ......... 707/693; 707/736; 707/757; 709/247
(58) Field of Classification Search ........................ None
See application file for complete search history.

(56) References Cited

U.S. PATENT DOCUMENTS

| 7,924,183 | B2 * | 4/2011 | Gui et al. ........................ 341/87 |
| 7,979,403 | B2 * | 7/2011 | Kedem et al. ................. 707/693 |
| 2004/0193459 | A1 | 9/2004 | Delaney et al. |
| 2005/0071593 | A1 * | 3/2005 | Vincent ......................... 711/165 |
| 2009/0012951 | A1 | 1/2009 | Vella |

* cited by examiner

*Primary Examiner* — Tim T Vo
*Assistant Examiner* — Hasanul Mobin
(74) *Attorney, Agent, or Firm* — Haynes and Boone, LLP

(57) ABSTRACT

System and method for implementing a reliable persistent random access compressed data stream is described. In one embodiment, the system comprises a computer-implemented journaled file system that includes a first file for storing a series of independently compressed blocks of a data stream; a second file for storing a series of indexes corresponding to the compressed blocks, wherein each one of the indexes comprises a byte offset into the first file of the corresponding compressed block; and a third file for storing a chunk of data from the data stream before it is compressed and written to the first file. The system further comprises a writer module for writing uncompressed data to the third file and writing indexes to the second file and a compressor module for compressing a chunk of data from the third file and writing it to the end of the first file.

20 Claims, 5 Drawing Sheets

SYSTEM AND METHOD FOR IMPLEMENTING A RELIABLE PERSISTENT RANDOM ACCESS COMPRESSED DATA STREAM

BACKGROUND

Currently, a variety of file compression programs exist for reducing the amount of storage space required to store data. However, none of these programs provide a way to efficiently persist a compressed data stream comprising event records in a manner that allows any of the event records to be addressed and randomly read in an efficient manner; that is, without requiring decompression of all of the preceding records. The real time data rate of the uncompressed records could be very high and constant or very slow and sporadic with no way to predict when the next record will arrive. It will be recognized that the records should also be persisted in a way that minimizes data loss and corruption in the event of program or system failure without the significant overhead required to perform an fsync operation usually associated with transactional integrity.

SUMMARY

One embodiment is a system for implementing a reliable persistent random access compressed data stream is described. In one embodiment, the system comprises a computer-implemented journaled file system that includes a first file for storing a series of independently compressed blocks of a data stream; a second file for storing a series of indexes corresponding to the compressed blocks, wherein each one of the indexes comprises a byte offset into the first file of the corresponding compressed block; and a third file for storing a chunk of data from the data stream before it is compressed and written to the first file. The system further comprises a writer module for writing uncompressed data to the third file and writing indexes to the second file and a compressor module for compressing a chunk of data from the third file and writing it to the end of the first file.

DETAILED DESCRIPTION

Figure 1:
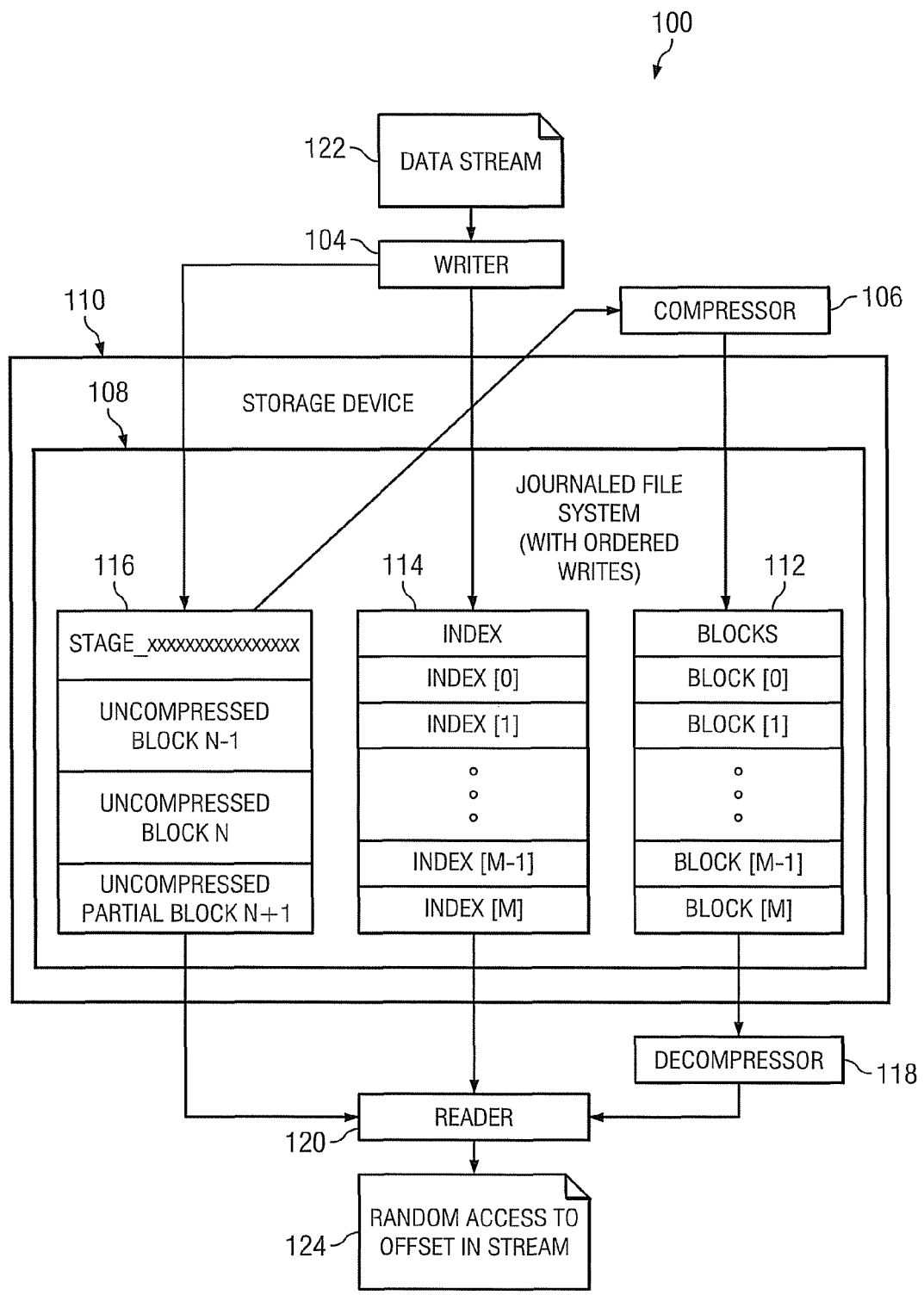
FIG. 1 a block diagram of a system for implementing a reliable persistent random access compressed data stream in accordance with on embodiment.
Figure 2:
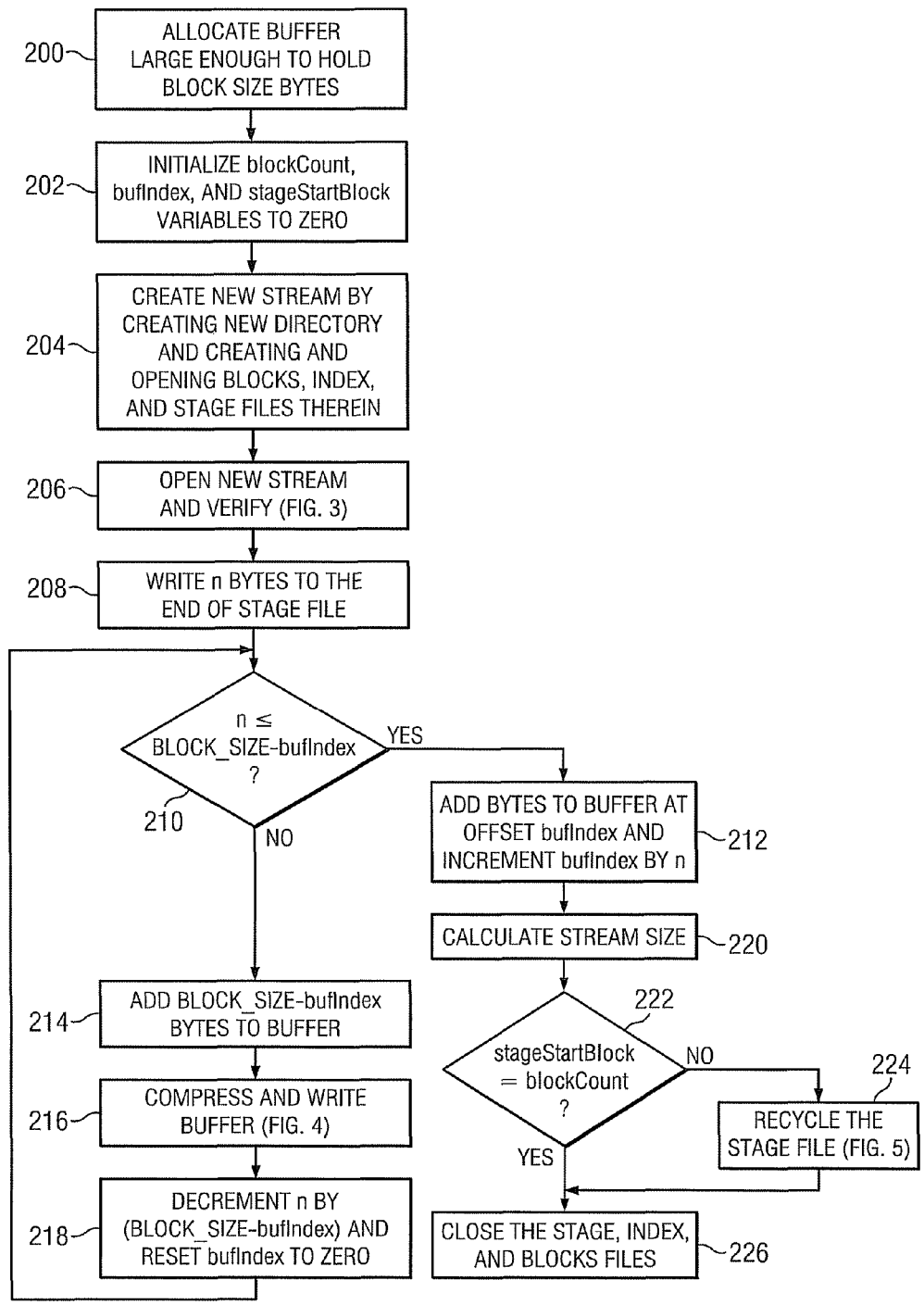
FIG. 2 is a flowchart illustrating a method of writing a stream in accordance with one embodiment.

One embodiment is a system and method for implementing a reliable persistent random access compressed data stream. FIG. 1 a block diagram of a system 100 in which a method for implementing a reliable persistent random access compressed data stream in accordance with one embodiment may be implemented. In one embodiment, the system 100 is implemented using a computer comprising at least one processor and storage media associated with the at least one processor. As shown in FIG. 1, the system 100 includes a writer module 104, a compressor module 106, and a journaled filing system 108 stored in a storage device 110. In accordance with one embodiment, the journaled file system 108 includes a BLOCKS file 112, an INDEX file 114, and at least one STAGE_xxxxxxxxxxxxxxxx (or simply STAGE) file 116, each of which will be described in greater detail below. The system 100 further includes a decompressor module 118 and a reader module 120. In one embodiment, the writer module 104, compressor module 106, decompressor module 118, and reader module 120 are implemented by the at least one processor's executing appropriate instructions stored on computer-readable media to carry out the functions of each module.

In the illustrated embodiment, during a write operation, a data stream 122 is input to the writer 104. As will be described with reference to FIGS. 2-6, the data stream is provided to both the INDEX and STAGE files 114, 116. Additionally, blocks of the data stream are compressed by the compressor 106 and written to the BLOCKS file 112.

During a read operation, blocks of data are read from the BLOCKS file 112 and decompressed by the decompressor 118, which provides the decompressed blocks to the reader 120, which provides random access to an offset in the data stream, as represented by a reference numeral 124, using data from the INDEX and STAGE files 114, 116.

The BLOCKS file 112 contains a sequence of independently compressed blocks. Each compressed block contains the compressed form of some fixed number of uncompressed bytes, designated "BLOCK_SIZE". The number BLOCK_SIZE is selected such that a compromise is reached between enabling efficient compression and reducing the overhead required to access a small piece of data within the block. For ease of reference, it will be assumed that M blocks, designated block[0]-block[M−1], may be stored in the BLOCKS file 112. In one embodiment, BLOCK_SIZE is 64K. The compression algorithm and block format used is Deflate, as produced by the Java Runtime Environment ("JRE") class: java.util.zip.Deflater.

The INDEX file 114 contains a sequence of 64-bit unsigned integers in network order that represent the byte offset into the BLOCKS file after the end of each compressed bloc. The start of each block is assumed to be at the beginning of the BLOCKS file and the start of each subsequent block is assumed to immediately follow the end of the previous block, or reference, it will be assumed that the INDEX entries are numbered in a manner similar to that as the blocks; i.e., index[0]-index[M−1]. Thus, the offset of block[0] in the BLOCKS file is 0 and the size of block[0] is index[0]. For any other block[N], the start of the block is index[N−1] and the size of the block is index[N]-index[N−1].

One or more STAGE files, represented in FIG. 1 by a STAGE file 116, exist and serve as staging areas for data blocks before they are compressed and written to the BLOCKS file. Each STAGE file is named "STAGE_xxxxxxxxxxxxxxxx," where xxxxxxxxxxxxxxxx is a zero padded hexadecimal number representing the block number of the block into which the data being staged will be written.

One embodiment requires that the files 112-116 be stored on a journaled file system, such as the system 108, that supports ordered or data journaling in order to provide a measure of corruption protection in the event of a system crash. Ext3 in ordered or data mode is known to possess these characteristics.

FIGS. 2-5 illustrate a flowchart of a method of writing a stream in accordance with one embodiment. First, the stream is opened for writing, which is accomplished as described below with reference to steps 200-206. In particular, in step 200, a buffer large enough to hold BLOCK_SIZE bytes of data is allocated. In step 202, internal state variables "blockCount," "bufIndex," and "stageStartBlock" are initialized to 0. In step 204, a new stream is created by creating a new directory the name of which is the name of the stream. Within that newly named directory, initially empty files BLOCKS, INDEX, and STAGE_xxxxxxxxxxxxxxxx are created and opened. In step 206, an existing stream is opened for writing and verified using a method illustrated in and described with respect to FIG. 3.

Figure 3:
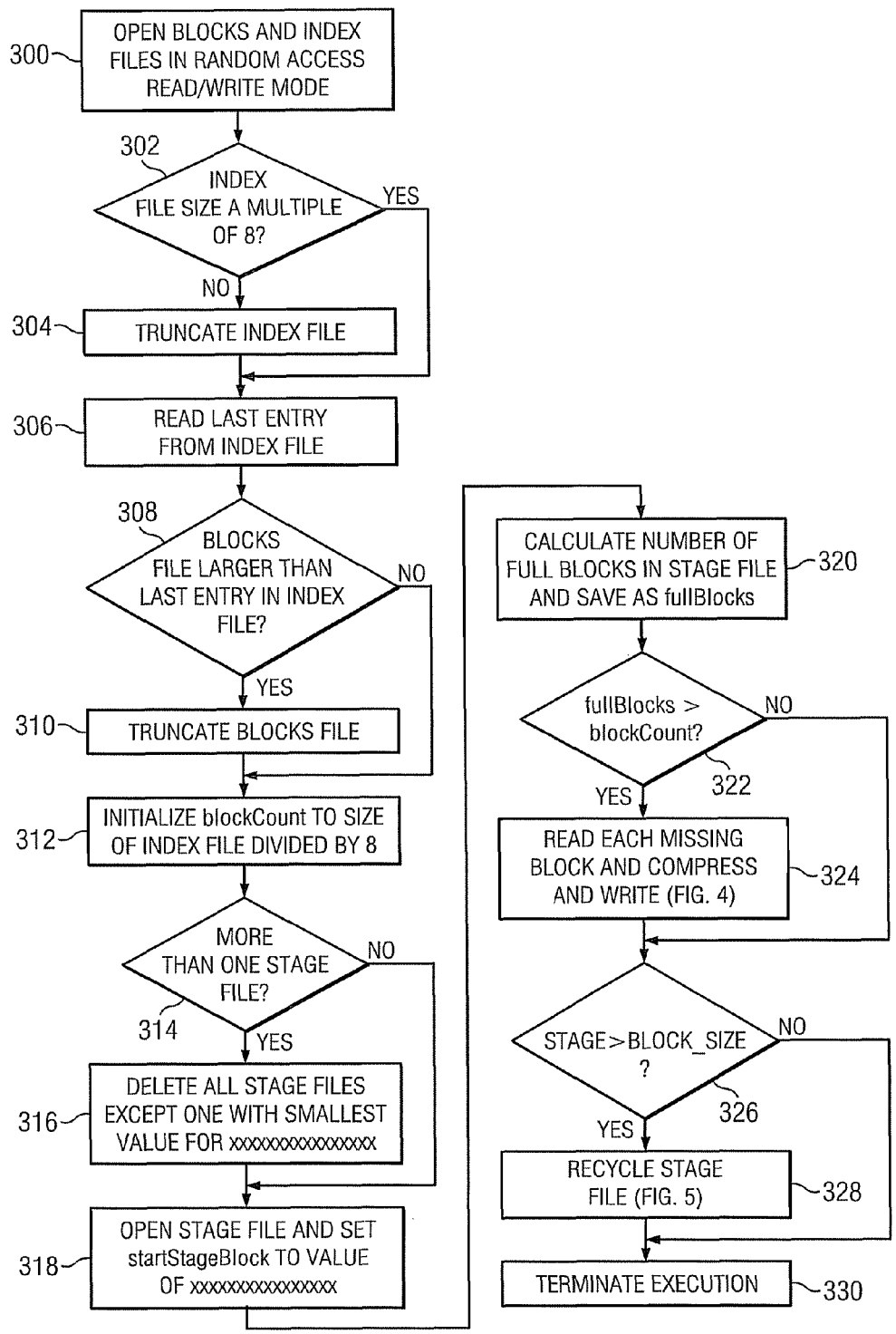
FIG. 3 is a flowchart illustrating a portion of the method of FIG. 2 for opening and verifying a stream in accordance with one embodiment.

Referring now to FIG. 3, in step 300, the existing BLOCKS and INDEX files are opened in random access read/write mode. In step 302, a determination is made whether the INDEX file size is a multiple of eight bytes. If a negative determination is made in step 302, execution proceeds to step 304, in which the index file is truncated to the next lowest eight bytes, and then to step 306. If a positive determination is made in step 302, execution proceeds directly to step 306. In step 306, the last entry (i.e., the last eight bytes) is read from the INDEX file; this number should be equal to the size of the BLOCKS file. In step 308, a determination is made whether the BLOCKS file is larger than the size indicated by the last entry of the INDEX file, indicating that the system or program crashed some time after the beginning of the last compressed block was written to the BLOCKS file, but before the INDEX file was updated to point to the end of that block. If a positive determination is made in step 308, execution proceeds to step 310, in which the BLOCKS file is truncated to the size indicated by the last entry in the INDEX file, and then to step 312. If a negative determination is made in step 308, execution proceeds directly to step 312.

In step 312, blockCount is initialized to the size of the INDEX file divided by eight. In step 314, a determination is made whether there is more than one STAGE file, indicating the occurrence of a system or program crash during the process or recycling of the STAGE file. If a positive determination is made in step 314, execution proceeds to step 316, in which all of the STAGE files except for the one with the smallest value for xxxxxxxxxxxxxxxx are deleted, and then to step 318. If a negative determination is made in step 314, execution proceeds directly to step 318. In step 318, the remaining STAGE file is opened and stageStartBlock is set to the parsed value of xxxxxxxxxxxxxxxx. In step 320, the number of full blocks in the STAGE files is calculated by dividing the size of the STAGE file by BLOCK_SIZE; this number is stored in a temporary variable designated fullBlocks. In step 322, a determination is made whether the value of (stageStartBlock+fullBlocks) is greater than blockCount, indicating that the system or program crashed after the block was written to the STAGE file, but before it was compressed and completely written to the BLOCKS and INDEX files. If a positive determination is made in step 322, execution proceeds to step 324, in which each missing block is read from the STAGE file and compressed and written as described in connection with FIG. 4 below, and then to step 326. If a negative determination is made in step 322, execution proceeds directly to step 326. In step 326, a determination is made whether the STAGE file is larger than BLOCK_SIZE. If so, execution proceeds to step 328, in which the STAGE file is recycled as described in connection with FIG. 5 below, and then to step 330. If the STAGE file is not larger than BLOCK_SIZE, execution proceeds directly to step 330. In step 330, execution terminates.

Referring again to FIG. 2, in step 208, n bytes are written immediately to the end of the STAGE file. In step 210, a determination is made whether n is less than or equal to the value of (BLOCK_SIZE−bufIndex). If a positive determination is made in step 210, execution proceeds to step 212, in which the bytes are added to the buffer at offset bufIndex and bufIndex is incremented by n. If a negative determination is made in step 210, execution proceeds to step 214, in which (BLOCK_SIZE−bufIndex) bytes are added to the buffer and the buffer is compressed and written as described in FIG. 4 below. In step 216, n is decremented by (BLOCK_SIZE−bufIndex). In step 218, bufIndex is reset to 0. Execution then returns to step 210 and the process is repeated with n being reevaluated against (BLOCK_SIZE−bufIndex) until all bytes are accounted for.

Figure 4:
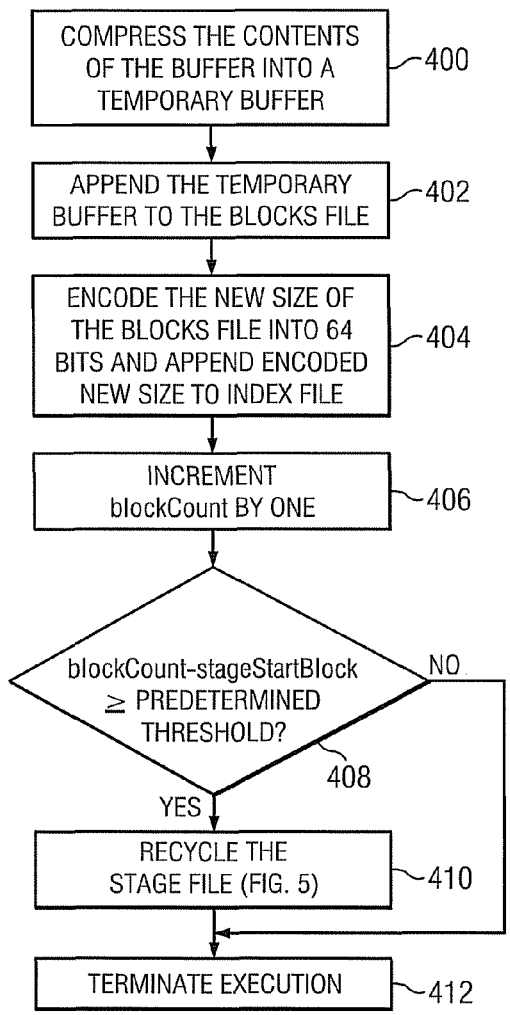
FIG. 4 is a flowchart illustrating a portion of the method of FIG. 2 for compressing and writing a block in accordance with one embodiment.

The process of compressing and writing a block will now be described with reference to FIG. 4. In step 400, the contents of the buffer are compressed into a temporary buffer. In step 402, the temporary buffer is appended to the end of the BLOCKS file. In step 404, the new size of the BLOCKS file is encoded into 64 bits and appended to the end of the INDEX file. In step 406, blockCount is incremented by one. In step 408, a determination is made whether blockCount-stageStartBlock has reached or exceeded some predetermined threshold value (e.g., 128). If a positive determination is made in step 408, execution proceeds to step 410, in which the STAGE file is recycled as described in FIG. 5 below, after which execution terminates in step 412. If a negative determination is made in step 408, execution proceeds directly to step 412.

Figure 5:
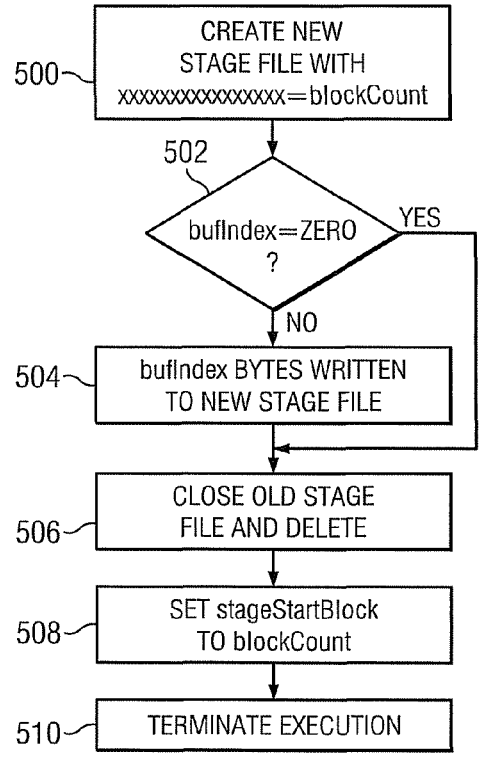
FIG. 5 is a flowchart illustrating a portion of the method of FIG. 2 for recycling a STAGE file in accordance with one embodiment.

The process of recycling the STAGE file will now be described with reference to FIG. 5. In step 500, a new STAGE file is created with xxxxxxxxxxxxxxxx set to equal blockCount. In step 502, a determination is made whether bufIndex is equal to 0. If a negative determination is made, execution proceeds to step 504, in which bufIndex bytes are written to the new STAGE file, and then to step 506. If a positive determination in made in step 502, execution proceeds directly to step 506. In step 506, the old STAGE file is then closed and deleted and in step 508, stageStartBlock is set to blockCount. Execution terminates in step 510.

Referring again to FIG. 2, in step 220, the stream size is calculated; however, it will be understood that calculation of the stream size, which is also the current offset into the stream, can be performed at any point using the formula:

$$(blockCount*BLOCK\_SIZE)+bufIndex$$

After all of the foregoing steps are performed, the stream is closed as follows. In step 222, a determination is made whether stageStartBlock=blockCount. If not, execution proceeds to step 224, in which the STAGE file is recycled as described above with reference to FIG. 5. Upon completion of step 224, in step 226, the STAGE, INDEX, and BLOCK files are closed.

Figure 6:
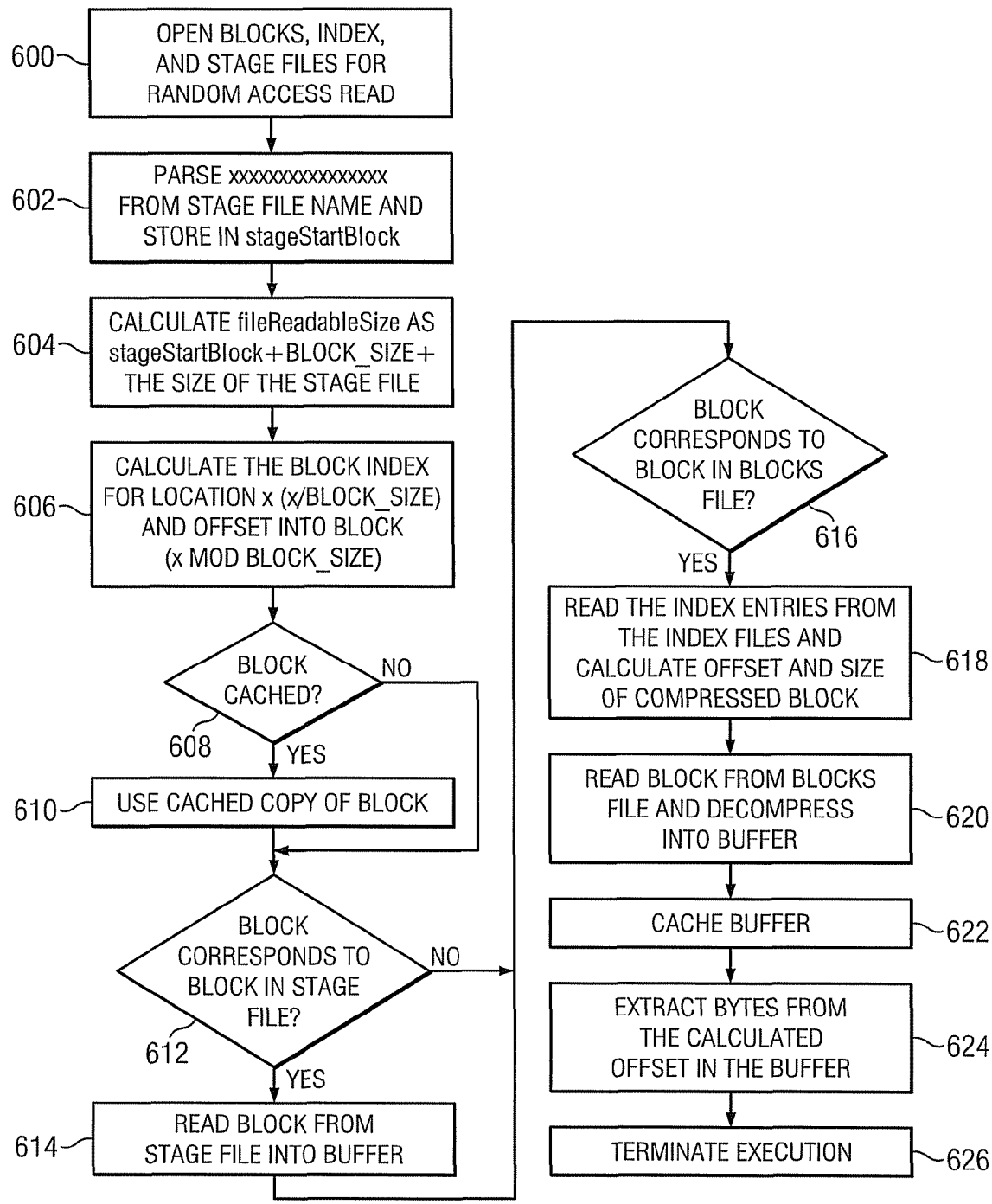
FIG. 6 is a flowchart illustrating a method of reading a stream such as might be written using the method of FIG. 2 in accordance with one embodiment.

A process of reading the stream in accordance with one embodiment is illustrated in and described with reference to FIG. 6. In step 600, the stream to be read is opened for reading. In particular, the BLOCKS, INDEX and STAGE files are opened for random access read. If more than one STAGE file exists, the STAGE file with the smallest value for xxxxxxxxxxxxxxxx is selected as the STAGE file to open. In step 602, xxxxxxxxxxxxxxxx is parsed from the STAGE file name and stored in the variable stageStartBlock. In step 604, fileReadableSize is calculated as:

(stageStartBlock*BLOCK_SIZE)+the size of the STAGE file

Next, bytes are read from a location x. In particular, in step 606, the block index for location x is calculated by dividing location x by BLOCK_SIZE. Additionally, the offset into the block is calculated as x mod BLOCK_SIZE.

In step 608, a determination is made as to whether the block has been cached. If so, execution proceeds to step 610, in which the cached copy of the block is used. If a negative determination is made in step 608, execution proceeds to step 612, in which a determination is made whether the block corresponds to a block that is in the STAGE file. If so, in step 614, the block is read from the STAGE file into a buffer: otherwise, execution proceeds to step 616. In step 616, a determination is made whether the block corresponds to a block in the BLOCKS file. If so, in step 618, the index entries that enable calculation of the offset and size of the compressed block are read from the INDEX file. In step 620, the block is read from the BLOCKS file and decompressed into a buffer. In step 622, the buffer is cached. It will be noted that one of any number of caching algorithms may be used, such as remembering the most recently read block. In step 624, the bytes are extracted from the buffer at the calculated offset and the process is repeated if the requested range of bytes spans more than a single block. Execution terminates in step 626.

With regard to ordered journaling, two basic concepts thereof are implemented in ext3, First, file metadata is never committed to the journal until after the data associated with it has been committed to disk. The implication of this is that when appending to a file, the size will not be updated until the data is actually committed to disk and therefore it is known that there is no garbage data, as the only writing to a file performed is appending. Second, metadata updates are journaled in the order that they actually occurred. Given these two concepts, there is assurance that the algorithm for writing guarantees that all uncompressed data will be committed to the STAGE file before the corresponding compressed blocks are committed to the BLOCKS file; all compressed blocks are committed to the BLOCKS file before the corresponding entry is committed to the INDEX file; all index entries are committed to the INDEX file before the recycling of the corresponding STAGE file; and all writes to a new STAGE file are committed before deletion of the old STAGE file is committed. Note that the foregoing doesn't guarantee that no data will be lost, but it does guarantee that any loss will occur at the end and only in whole chunks and that such losses can be detected and recovered from partially committed compressed data blocks.

While the preceding description shows and describes one or more embodiments, it will be understood by those skilled in the art that various changes in form and detail may be made therein without departing from the spirit and scope of the present disclosure. For example, although embodiments have been described in connection with Ext3, it will be recognized that the teachings described herein may be implemented in connection with other ordered journaling systems. Additionally, various steps of the described methods may be executed in a different order or executed sequentially, combined, further divided, replaced with alternate steps, or removed entirely. Moreover, the various steps may be initiated manually by a user or other actor or automatically in response to other steps or conditions. In addition, various functions illustrated in the methods or described elsewhere in the disclosure may be combined to provide additional and/or alternate functions. Still further, the functions maybe implemented as computer-executable instructions stored on one or more computer-readable media for execution by a computer. Therefore, the claims should be interpreted in a broad manner, consistent with the present disclosure.

What is claimed is:

1. A system for implementing a reliable persistent randomly accessible compressed data stream, the system comprising:
    a computer-implemented journaled file system comprising:
        a first file for storing a series of independently compressed blocks of a data stream;
        a second file for storing a series of indexes corresponding to the compressed blocks, wherein each one of the indexes comprises a byte offset into the first file of the corresponding compressed block; and
        a third file for storing a chunk of data from the data stream before it is compressed and written to the first file;
    a writer module for writing a first chunk of data from the data stream before it is compressed to the third file and writing a first index to the second file, and for writing a second chunk of data from the data stream before it is compressed to the third file and writing a second index to the second file; and
    a compressor module for compressing the first chunk of data from the third file and writing it to the first file, and for compressing the second chunk of data from the third file and writing it to the first file,
wherein each of the indexes comprises an offset into the first file of the corresponding block.

2. The system of claim 1 wherein each of the indexes is an unsigned integer.

3. The system of claim 1 further comprising:
    a reader module for reading a block of data from a location in the first file; and
    a decompressor module for decompressing the read block of data for presentation to a user.

4. The system of claim 3 wherein the reader module determines a block index and offset for the location using the second file.

5. The system of claim 1 wherein the third file has associated therewith a zero padded hexadecimal number corresponding to a block number associated with the data chunk being staged therein.

6. The system of claim 1 wherein the journaled file system supports ordered journaling and ordered write guarantees.

7. A method for implementing a reliable persistent randomly accessible compressed data stream, the method comprising:
    creating an initially empty STAGE file, BLOCKS file, and INDEX file;
    writing a first chunk of data from a data stream to the STAGE file before the first chunk of data is compressed and written to the BLOCKS file;
    independently compressing the first chunk of data written to the STAGE file and writing it as a compressed first block to the BLOCKS file;
    writing a first index corresponding to the compressed first block to the INDEX file;
    writing a second chunk of data from the data stream to the STAGE file before the second chunk of data is compressed and written to the BLOCKS file;
    independently compressing the second chunk of data written to the STAGE file and writing it as a compressed second block to the BLOCKS file; and writing a second index corresponding to the compressed second block to the INDEX file,
wherein each of the indexes comprises a byte offset into the BLOCKS file of the corresponding compressed block.

8. The method of claim 7 wherein each of the indexes is an unsigned integer.

9. The method of claim 7 further comprising:
reading a block of data from a location in the BLOCKS file; and
decompressing the read block of data for presentation to a user.

10. The method of claim 9 wherein reading includes determining a block index and offset for the location using the INDEX file.

11. The method of claim 7 wherein the BLOCKS file contains a number of blocks of data,
wherein the INDEX file contains a number of indexes,
wherein the number of blocks of data and the number of indexes are the same.

12. The method of claim 7 wherein the STAGE file has associated therewith a zero padded hexadecimal number corresponding to a block number associated with the data chunk being staged therein.

13. A method for implementing a reliable persistent randomly accessible compressed data stream, the method comprising:
accumulating first data from a data stream in a STAGE file;
responsive to accumulation of a first predetermined amount of first data in the STAGE file, compressing the accumulated first data into a first block of data;
writing the compressed first block of data to a BLOCKS file at a first offset;
writing a first index indicating the first offset of the compressed first block to an INDEX file;
after writing the compressed first block of data and the first index, accumulating second data from the data stream in the STAGE file;
responsive to accumulation of a second predetermined amount of second data in the STAGE file, compressing the accumulated second data into a second block of data;
writing the compressed second block of data to the BLOCKS file at a second offset;
writing a second index indicating the second offset of the compressed second block to the INDEX file.

14. The method of claim 13 wherein the second offset is a next available location in the BLOCKS file after the compressed first block of data.

15. The method of claim 13 further comprising, responsive to a request to read a block of data from a location in the BLOCKS file, determining a block index and offset for the location using the INDEX file.

16. The method of claim 13 wherein each of the indexes is an unsigned integer.

17. The method of claim 13 wherein the BLOCKS file contains blocks of data and wherein the INDEX file contains indexes corresponding in order to the blocks, such that each index comprises an offset into the BLOCKS file of the corresponding block.

18. The method of claim 13 wherein the STAGE file has associated therewith a zero padded hexadecimal number corresponding to a block number associated with the data accumulating therein.

19. The method of claim 13 wherein the STAGE file is recycled.

20. The method of claim 13 wherein the first predetermined amount and the second predetermined amount are the same.

* * * * *